US012023680B2

(12) United States Patent
Brindle

(10) Patent No.: US 12,023,680 B2
(45) Date of Patent: Jul. 2, 2024

(54) DISTRIBUTOR PLATE

(71) Applicant: Metso Outotec Sweden AB, Trelleborg (SE)

(72) Inventor: Elliott Brindle, Wells (GB)

(73) Assignee: Metso Outotec Sweden AB, Trelleborg (SE)

( * ) Notice: Subject to any disclaimer, the term of this patent is extended or adjusted under 35 U.S.C. 154(b) by 147 days.

(21) Appl. No.: 17/690,382

(22) Filed: Mar. 9, 2022

(65) Prior Publication Data

US 2022/0288600 A1 Sep. 15, 2022

(30) Foreign Application Priority Data

Mar. 9, 2021 (SE) .................................... 2150269-5

(51) Int. Cl.
*B02C 13/286* (2006.01)
*B02C 13/18* (2006.01)

(52) U.S. Cl.
CPC ........ *B02C 13/286* (2013.01); *B02C 13/1814* (2013.01); *B02C 13/1835* (2013.01); *B02C 2013/28681* (2013.01)

(58) Field of Classification Search
CPC . B02C 13/185; B02C 13/286; B02C 13/1835; B02C 2013/28681; B02C 2013/2808
See application file for complete search history.

(56) References Cited

U.S. PATENT DOCUMENTS 4,065,063 A * 12/1977 Johnson .............. B02C 13/1835 241/275
4,090,673 A * 5/1978 Ackers ................ B02C 13/1814 241/275
6,070,820 A * 6/2000 Young ................. B02C 13/1814 241/300
7,090,159 B2 * 8/2006 Condon ................ B02C 13/286 241/296

(Continued)

FOREIGN PATENT DOCUMENTS

WO WO-2005039776 A1 * 5/2005 ......... B02C 13/1807

OTHER PUBLICATIONS

Office Action and Search Report for priority Swedish Patent Application No. 2150269-5, mailed Sep. 7, 2021.

*Primary Examiner* — Faye Francis
(74) *Attorney, Agent, or Firm* — Andrus Intellectual Property Law, LLP

(57) ABSTRACT

A rotor for a comminution apparatus. The rotor includes a frame including an upper plate, a lower plate and wall elements. The rotor further includes an inlet opening in the upper plate and one or more outlets located between the upper plate and the lower plate. A distributor plate is arranged at an upper surface of the lower plate below the inlet opening and is arranged to launch the material towards a contact surface. The distributor plate includes a cavity being open at a lower surface of the distributor plate. The rotor further includes attachment means for maintaining the distributor plate at the upper surface of the lower plate. The (Continued)

attachment means are arranged to frictionally engage with a corresponding surface of the cavity and the attachment means enable the distributor plate to be repositioned into different wear positions.

13 Claims, 6 Drawing Sheets

(56) References Cited

U.S. PATENT DOCUMENTS

| | | | | |
|---|---|---|---|---|
| 2006/0011762 | A1* | 1/2006 | Dallimore | B02C 13/1835 241/275 |
| 2011/0024539 | A1 | 2/2011 | Strauss et al. | |
| 2016/0288131 | A1* | 10/2016 | Esbelani | B02C 13/185 |
| 2017/0173590 | A1* | 6/2017 | Kjaerran | B02C 13/1842 |
| 2017/0209866 | A1* | 7/2017 | Forsberg | B02C 13/286 |
| 2022/0297132 | A1* | 9/2022 | Kjaerran | B02C 13/1835 |

* cited by examiner

DISTRIBUTOR PLATE

CROSS-REFERENCE TO RELATED APPLICATIONS

This application is the U.S. national patent which claims priority of Swedish Patent Application No. 2150269-5, filed Mar. 9, 2021.

FIELD OF THE DISCLOSURE

The present disclosure relates to crushing equipment for crushing rock, ore or similar. More specifically, the invention relates to a so-called vertical shaft impact crusher comprising a rotatable distributor plate.

BACKGROUND ART

When crushing or grinding rock, ore, cement clinker and other hard or soft materials, vertical shaft impact crushers are used having a rotor rotating around a vertical axis. The material to be crushed is fed through a centrally arranged opening in the rotor. A distributor plate is arranged at an upper surface of a lower plate of the rotor. As the material to be crushed hits the rotating distributor plate, the material will change direction from vertical to horizontal and will be hauled generally radially outwardly and hit an outer crushing surface. The outer crushing surface typically comprising a build-up of material to be crushed created on an inner surface of a crushing chamber creating autogenous crushing. Such autogenous crushing has proven to guarantee superior shaped particles, for example in aggregate. However, with current rotors, there may be a problem with the distributor plate being unevenly worn out. Thus, the distributor plate may have to be replaced although only a part of the distributor plate is worn out.

In an attempt to meet this problem, prior art solutions disclose distributor plates having a continuous flat upper surface, wherein the plate is fastened to the shaft by means of cooperating shapes of recess and bolts. One element may be lifted by means of a lever and rotated by hand into a new wear position. However, a problem with the solution in the prior art document is that fastening means of the distributor plate, or parts of the distributor plate, may have to be loosened before being able to rotate the distributor plate into the new wear position. Further, if the distributor plate needs to be lifted for rotation, dirt may come in between the lower plate and the distributor plate causing instability of the distributor plate. Thus, there is a need in the art for a more user-friendly process for rotating the distributor plate into the new wear position as well as to provide a process which is more efficient and simplified.

SUMMARY

It is an object to mitigate, alleviate or eliminate one or more of the above-identified deficiencies in the art and disadvantages singly or in any combination and solve at least the above-mentioned problem. According to a first aspect there is provided a rotor for a comminution apparatus, the rotor being arranged to launch material to be comminuted towards a surface, the rotor comprising:

a frame including an upper plate, a lower plate and wall elements extending between the upper plate and the lower plate;

an inlet opening in the upper plate and one or more outlets located between the upper plate and the lower plate, wherein the inlet opening is arranged to receive the material and wherein the material is launched through the one or more outlets towards the surface; and a distributor plate arranged at an upper surface of the lower plate and below said inlet opening wherein the distributor plate is arranged to launch the material towards the surface, wherein the distributor plate comprises a cavity being open at a lower surface of the distributor plate, wherein the rotor further comprises attachment means for maintaining the distributor plate at the upper surface of the lower plate, wherein said attachment means are arranged to frictionally engage with a corresponding surface of the cavity and wherein the attachment means enable the distributor plate to be repositioned into different wearing positions.

The surface that the material may be comminuted towards may be located within the comminution apparatus but outside the rotor. The surface may be an inside surface of the comminution apparatus.

The rotor is advantageous as the attachment means provides for that the distributor plate is kept in place when repositioning the distributor plate into the different wear positions. This may be possible by the attachment means being arranged to frictionally engage with the corresponding surface of the cavity. The rotor is advantageous as it provides for that no bolt, or the like, may be going through the entire distributor plate in order to keep the distributor plate in place. Instead, the attachment means is arranged to keep the distributor in place, e.g. to keep the distributor plate from rising. The friction between the lower surface of the distributor plate and the upper surface of the lower plate provides friction preventing relative rotation of the distributor plate and the lower plate and the attachment means of the invention provides additional friction preventing this relative rotation. Thus, the attachment means may be advantageous as it provides for that the distributor plate is kept in place at the lower plate. A mounting plate may be arranged on an upper surface of the lower plate in the rotor. The mounting plate can be attached on top of a rotor boss together with the rotor such that an upper surface of the mounting plate will be arranged at or near an upper surface of the lower plate of the rotor which is also attached to the rotor boss.

The attachment means is further advantageous as it may provide for that no bolt or other locking means need to be loosened before being able to reposition the distributor plate into the different wear positions. Further, the attachment means also provides for that the distributor plate may be kept in place, at the mounting plate, while repositioning the distributor plate. Hence, there is no need for lifting the distributor plate when moving it into the different wear positions but instead rotate the distributor plate into the different positions without creating any gap potentially causing dirt to get underneath. Further, there is no need for loosening any bolts or other locking means before being able to reposition the distributor plate into the different wearing positions. The distributor plate may be repositioned by hand force, using a lever, crowbar, iron rod or the like. Thus, the distributor plate may be rotated from outside the rotor without the need of loosening any bolts or similar. The distributor plate may further be repositioned without being limited to any fixed index points or present positioning points. Thus, the distributor plate may be rotated as much as needed based on the wear on the distributor plate. Thereby, a more user-friendly but also efficient way of rotating the distributor plate is achieved. Thus, the attachment means are arranged such that the distributor plate may be repositioned into the different wear positions as well as keeping the distributor plate in place.

By being able to reposition the distributor plate into different wear positions, an increased lifetime of the distributor plate may be achieved. Thus, the distributor plate is arranged to receive the material before launching the material towards the surface, but the material may hit the distributor plate unevenly before being launched towards the surface. Using distributor plates known in the art, the wear on the distributor plate may be uneven and thus, the distributor plate may be worn out differently at different positions of the distributor plate. Thus, by being able to reposition the distributor plate into different wear positions, a more uniform wear during the lifetime of the distributor plate may be achieved.

The distributor plate may be arranged on a mounting plate, wherein the mounting plate may be attached at the upper surface of the lower plate, preferably directly to a rotor boss of the crusher.

The wear properties may be optimized by the disclosed distributor plate being attached at the upper surface of the lower plate with the attachment means and being rotatable into different, non-predefined, wear positions. This may be performed from the outside and no bolts has to be loosened.

Hence, the rotor comprising the attachment means is advantageous over prior art in that it allows for repositioning the distributor plate into different wear positions from the outside without the need of loosen bolts or the like. Thus, the rotation of the distributor plate may be performed in an efficient and user-friendly way as well as the lifetime of the distributor plate may be increased.

According to some embodiments, the cavity is closed towards an upper surface of the distributor plate.

This rotor is advantageous as the cavity being closed towards the upper surface of the distributor plate provides for that no bolt, or the attachment means, is going through the entire distributor plate in order to keep the distributor plate in place. Instead, the attachment means, as introduced above, is arranged to keep the distributor in place, e.g. to keep the distributor plate from rising. By the cavity being closed towards the upper surface of the distributor plate provides for that the upper surface may have a substantially continuous surface without any recesses. This may be advantageous as the wear properties of the distributor plate is improved in comparison with a plate having bolt holes arranged in an upper surface thereof. The upper surface of the distributor plate may in some embodiments be flat. However, it should be noted that the upper surface of the distributor plate may be arranged as a non-flat upper surface as well. The possibilities of having both the substantially flat upper surface but also the non-flat upper surface provides for that the distributor plate may be designed in different ways but still be attached to the mounting plate in the same way.

According to some embodiments, the attachment means comprises a shaft having a first end and a second end, a hub provided at the second end and a friction enhancing means arranged at the hub.

This attachment means may be advantageous as the friction enhancing means provides for that the distributor plate may be kept in place at the upper surface of the mounting plate. The first end of the shaft may be installed in the upper surface of the mounting plate and on the second end, the distributor plate may be installed. Thereby, the friction enhancing means may be frictionally engaged with the corresponding surface in the cavity in the distributor plate. The friction enhancing means may be advantageous as it may provide a friction and/or a mechanical holding force against the distributor plate and thereby, keep the distributor plate in place, both in a rotational and a vertical direction. The distributor plate may be attached to the attachment means by pushing the distributor plate towards the attachment means such that the attachment means is interacting with a corresponding surface in the distributor plate.

The friction enhancing means may be arranged to keep the distributor plate in place as well as the distributor plate should be substantially easy to remove if needed.

The friction enhancing means may be a metal coil spring, e.g. steel coil spring, being, compressible in a radially inwardly direction. Alternatively, the friction enhancing means may be made from rubber or any other resiliently deformable material. The inner surface of the cavity of the distributor plate may be arranged to provide such radial compression of the spring or similar, thereby achieving the frictional engagement. The spring force may be between 50-10 000 N depending on for example size of equipment. The purpose to avoid that the distributor plate moves relative to the lower plate of the rotor. In one embodiment, the spring force may be 500-5000 N, in one embodiment 1000-2000 N. Thus, the spring force may have to be sufficiently large in order to keep the distributor plate in place.

The friction enhancing means, for example a spring, may be arranged in a radially outwardly open groove arranged in the hub.

According to some embodiments, the cavity in the distributor plate may have a cylindrical inner shape against which the friction enhancing means, i.e. a spring or similar, acts. This provides a simple solution that may be realized directly in an opening in the distributor plate. It can also be realized by means of a tubular member welded or otherwise attached to the distributor plate.

According to some embodiments, the cavity in the distributor plate may have a recess in the inner side wall having a shape at least partly matching that of the friction enhancing means. This could for example be a part torus shaped recess along a circumference in the inner side wall of the cavity. These corresponding shapes create a mechanical holding force in addition to the friction force created between the outer surface of the friction enhancing means and the inner side wall of the cavity. Instead of a part torus shaped recess, having a cross section comprising a circular segment with an arc defining the side wall in the cavity, the cross section of the recess could have many other shapes. For example, triangular, part elliptical, etc. As long it creates a recess in which the friction enhancing means can expand partly into creating a mechanical holding force against a lifting of the distributor plate, any shape is conceivable.

According to some embodiments, an inner wall of the cavity in the distributor plate may have a surface structure on at least a part thereof. Such structure could further improve friction properties between the cavity and the friction enhancing means. Examples of such surface structure is grooves and/or recesses and/or dimples.

According to some embodiments, the distributor plate comprises a base plate and a top plate, wherein the cavity comprises a recess in the base plate which is arranged to receive the attachment means.

This distributor plate may be advantageous as it allows for easier installing and replacement with pieces of the distributor plate compared to installing or replacing the entire distributor plate in once.

The base plate may be installed at the upper surface of the mounting plate with the attachment means and the top plate may be attached to the attachment means thereafter.

Thereby, the entire distributor plate may be attached to the upper surface of the mounting plate by the attachment means.

According to some embodiments, the recess comprises a through hole in the base plate. The cavity is closed upwardly by the top plate.

According to some embodiments, the recess comprises a blind hole in the base plate.

According to some embodiments, the distributor plate further comprises a middle plate and wherein the cavity comprises a recess in the middle plate which is arranged to receive the attachment means. In this case, the cavity comprises the recesses in the base plate and the middle plate.

According to some embodiments, the recess comprises a through hole in the base plate and a blind hole in the middle plate.

According to some embodiments, the recess comprises a through hole in the base plate and a through hole in the middle plate. The cavity is closed upwardly by the top plate.

The top plate and the middle plate may be put together by means of adhesive or the like. A collar may be installed in the center recess of the middle plate, e.g. welded to the middle plate. These pieces may be attached to the base plate via the attachment means.

Thus, the base plate may be installed at the upper surface of the mounting plate with the attachment means and the middle and top plate may be attached to the attachment means thereafter. Thereby, the entire distributor plate may be attached at the upper surface of the lower plate of the rotor by the attachment means. The base plate and/or the middle plate may be coated with a non-slip coating to reduce slippage therebetween.

The top plate may be made of wear resistant material. This may be advantageous as it may be substantially the top plate which is exposed to wear. The wear resistant material may comprise wear resistant material such as tungsten. Other embodiments comprise cast iron and different combinations of materials such as steel, tungsten, carbides, ceramics, polymers etc.

The wear material may be e.g. tungsten. The middle plate may be a Hardox plate or other similar wear plate. The base plate may be a Hardox plate or other similar wear plate. The collar may be a steel collar. The middle plate and the top plate may together have a weight between 5-75 kg. The base plate may have a weight between 5-15 kg.

According to some embodiments, the middle plate is provided with circumferentially arranged protrusions and recesses.

The middle plate provided with the circumferentially protrusions and recesses may be advantageous as it facilitates for a more user-friendly way of repositioning the distributor plate. Thus, the rod or the like which may be used for repositioning the distributor plate may be inserted into a recess between two protrusions. Thereby, a more stable and controllable rotation of the distributor plate may be achieved.

According to some embodiments, the distributor plate is made as a one-piece part. Similar to the previous embodiment, the one-piece distributor plate may be provided with circumferentially arranged protrusions and recesses. The cavity may be arranged as a blind hole in the one-piece distributor plate.

According to some embodiments, the friction enhancing means is made of a rubber material, metal such as steel, a polymer material, or a composite material.

The material of the friction enhancing means may be configured to provide friction and/or a mechanical holding force to keep the distributor plate from rising and to prevent rotation relative to the rotor. Thus, as said before, the distributor plate should be arranged to be kept in place by the attachment means.

According to a second aspect, there is provided a distributor plate in a rotor for a comminution apparatus, the distributor plate comprising an upper wear surface and a lower surface and a cavity which is open at said lower surface of the distributor plate.

According to some embodiments, the distributor plate comprises a base plate and a top plate wherein the upper wear surface is arranged on the top plate and the cavity comprises a recess in the base plate.

According to some embodiments, the distributor plate further comprises a middle plate and wherein the cavity comprises a recess in the middle plate.

According to some embodiments, the distributor plate further comprises a one-piece part comprising the upper wear surface and the cavity is open towards a lower surface thereof.

According to some embodiments, the distributor plate further comprising attachment means, wherein said attachment means are arranged to frictionally engage with a corresponding surface of the cavity and wherein the attachment means enable the distributor plate to be repositioned into different wear positions.

According to some embodiments, wherein the attachment means comprises a shaft having a first end and a second end, a hub provided at the second end of the shaft and a friction enhancing means arranged at the hub.

According to some embodiments, the top plate comprises wear resistant material such as tungsten. Other embodiments comprise cast iron and different combinations of materials such as steel, tungsten, carbides, ceramics, polymers etc.

According to a third aspect, there is provided a method for repositioning a distributor plate in a rotor for a comminution apparatus, the rotor being arranged to launch material to be comminuted towards a surface, the rotor comprising:

- a frame including an upper plate, a lower plate and wall elements extending between the upper plate and the lower plate;
- an inlet opening in the upper plate and one or more outlets located between the upper plate and the lower plate, wherein the inlet opening is arranged to receive the material and wherein the material is launched through the one or more outlets towards the surface; and
- a distributor plate arranged at an upper surface of the lower plate below said inlet opening wherein the distributor plate is arranged to launch the material towards the surface, wherein the distributor plate comprises a cavity being open at a lower surface of the distributor plate, the method comprising:

- providing attachment means to the upper surface of a mounting plate at the lower plate,
- attaching the distributor plate to the upper surface of the mounting plate with the attachment means, wherein said attachment means are arranged to frictionally engage with a corresponding surface of the cavity and wherein the attachment means are arranged for maintaining the distributor plate at the upper surface of the mounting plate, and
- repositioning the distributor plate by rotating the distributor plate into different wear positions.

According to some embodiments, the step of attaching the distributor plate to the upper surface of the mounting plate with the attachment means comprises pushing the distributor plate down towards the attachment means such that the attachment means is interacting with a corresponding surface in the distributor plate.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The disclosure will by way of example be described in more detail with reference to the appended [schematic] drawings, which show presently preferred embodiments of the disclosure.

Figure 1:
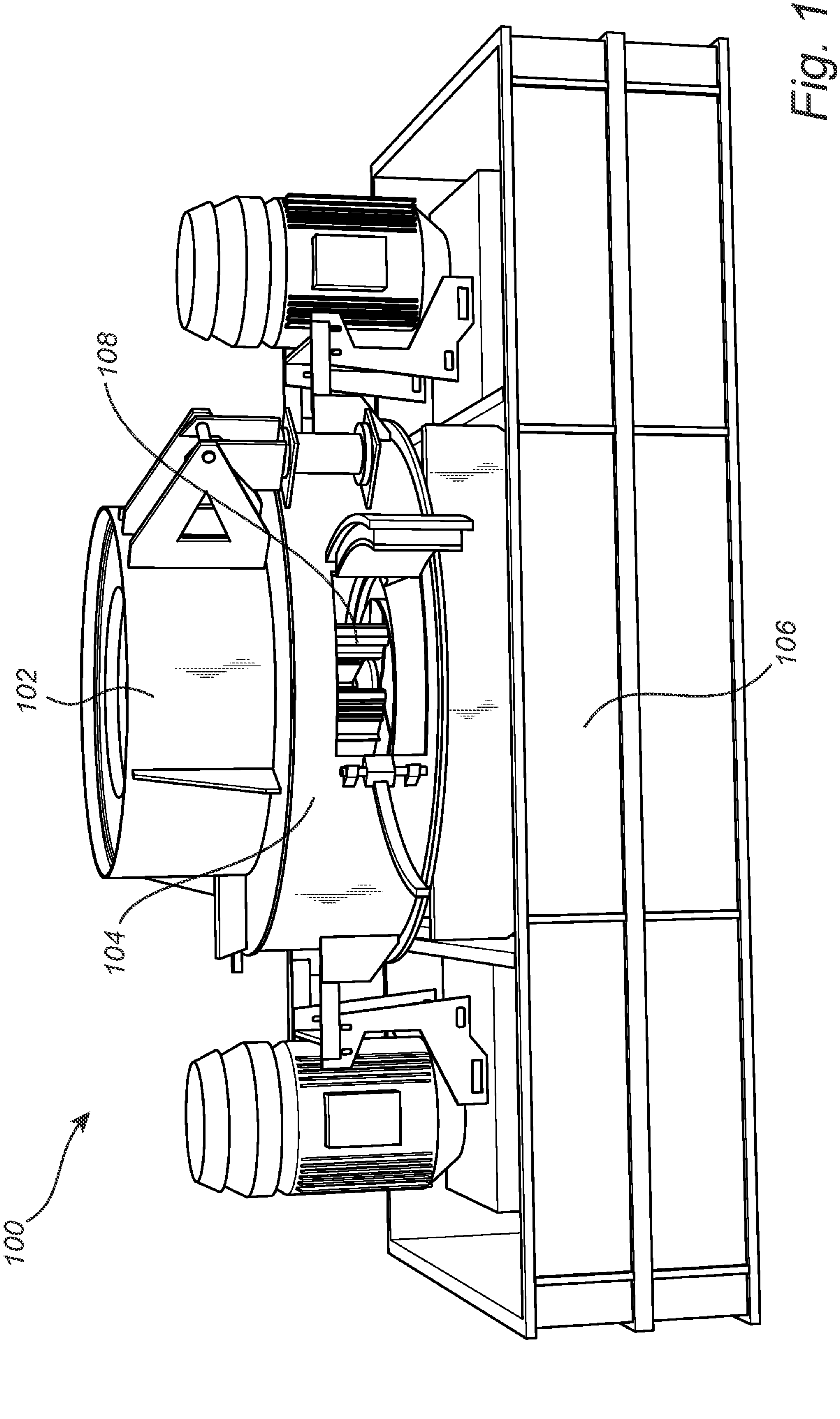
FIG. 1 shows a perspective view of a comminution apparatus.
Figure 4A:
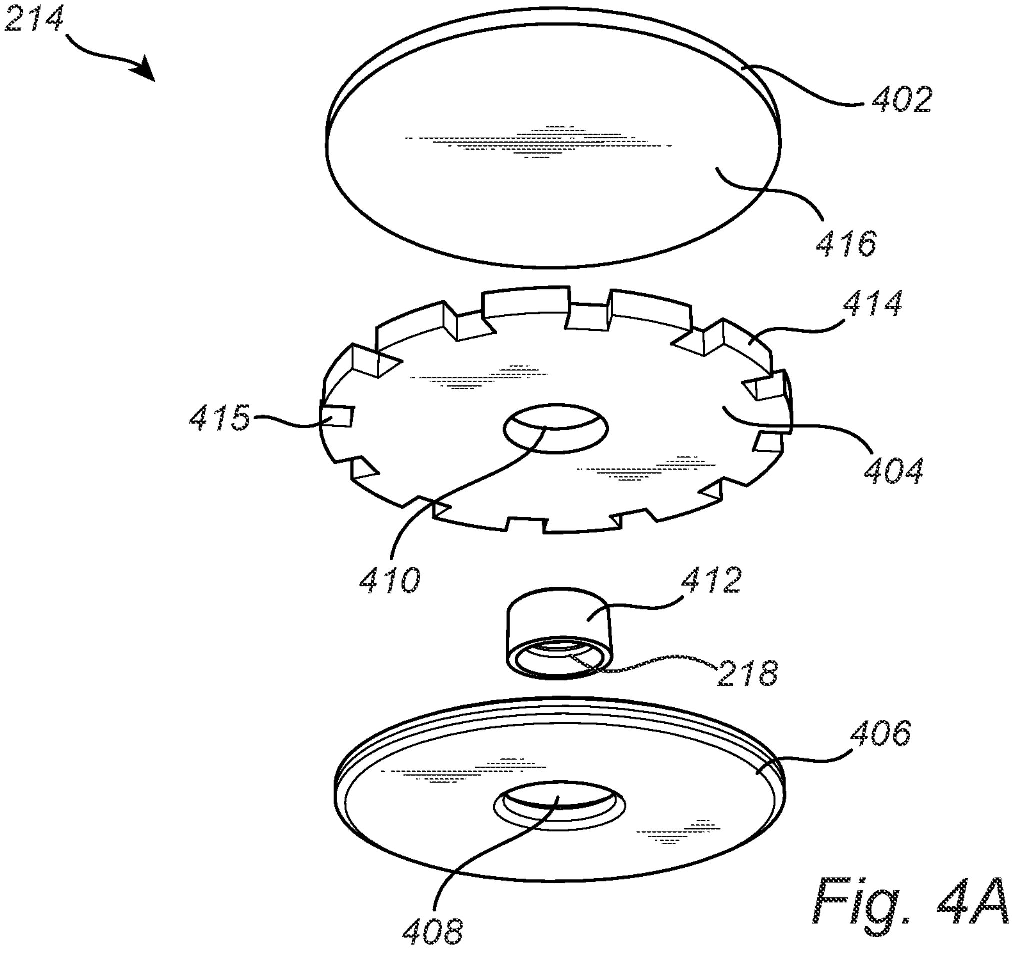

FIG. 4*a* shows a distributor plate comprised in the comminution apparatus of FIG. 1 according to an embodiment of the present disclosure.

Figure 4B:
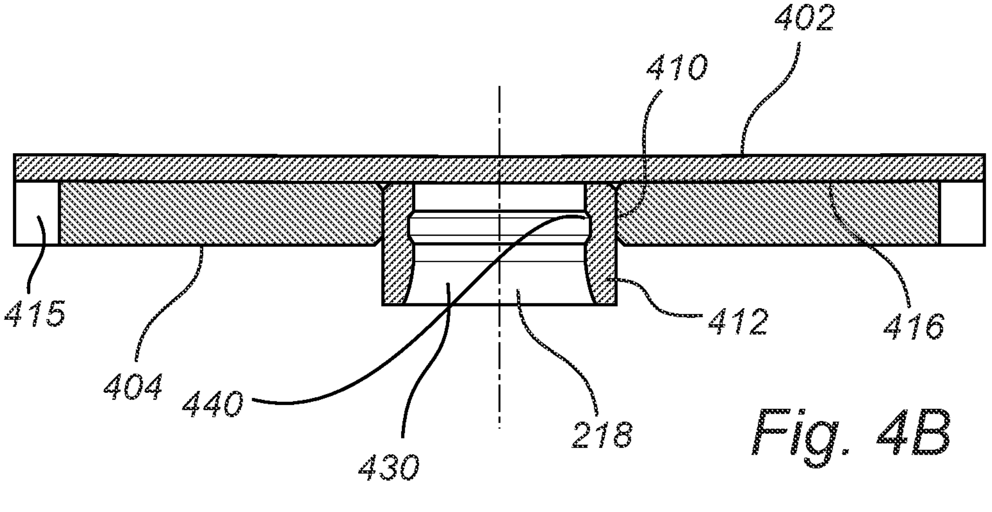

FIG. 4*b* shows a cross section of parts of the distributor plate of FIG. 4*b*.

Figure 4C:
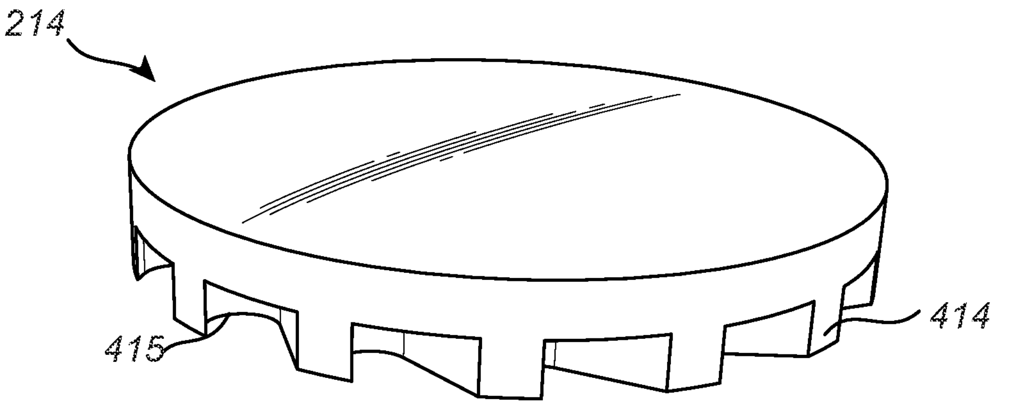

FIG. 4*c* shows a distributor plate comprised in the comminution apparatus of FIG. 1 according to an embodiment of the present disclosure.

Figure 5:
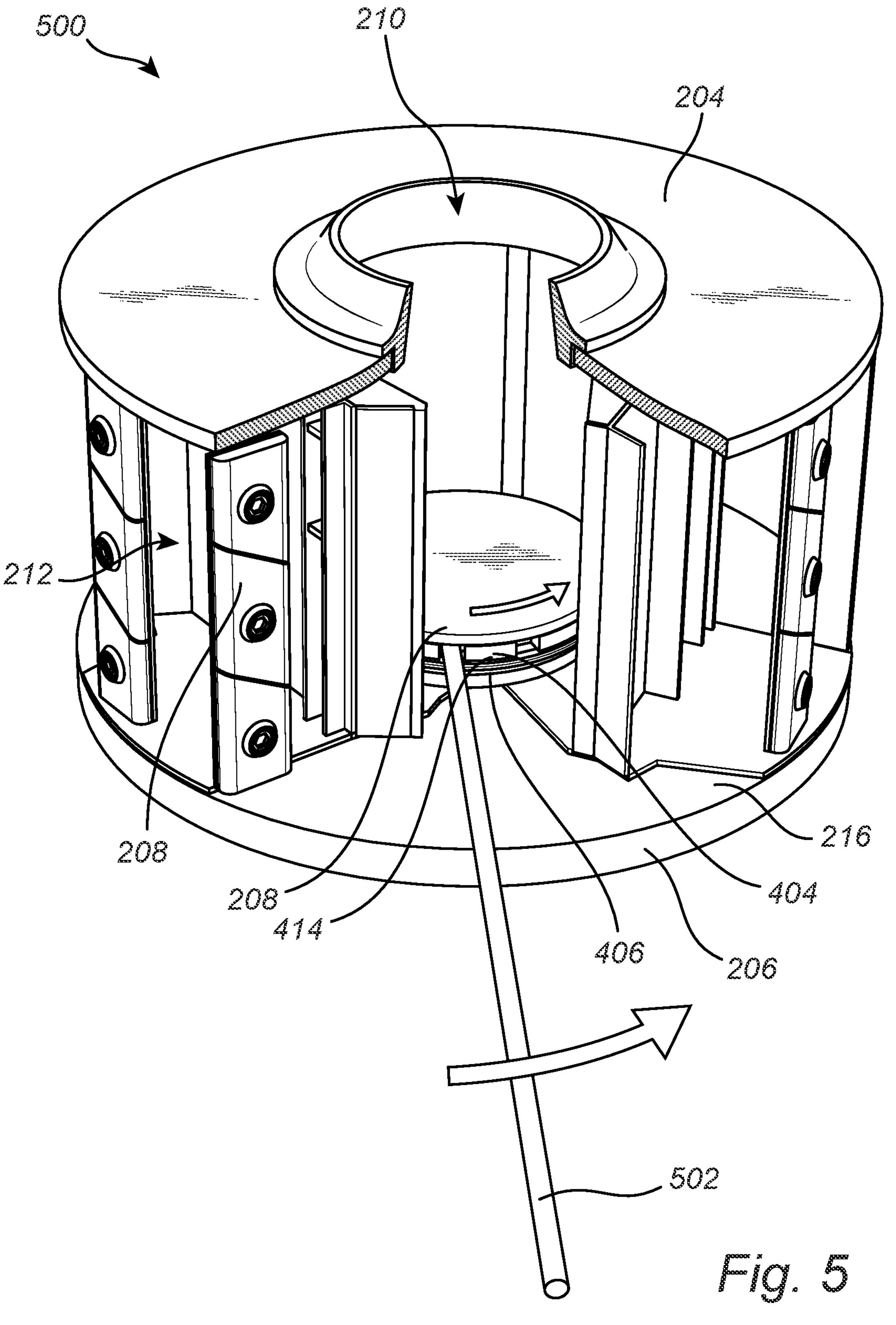

FIG. 5 shows a more detailed view of the interior of the rotor comprised in the comminution apparatus of FIG. 1.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

FIG. 1 illustrates a comminution apparatus 100 for crushing or grinding rock, ore, cement clinker and other hard materials or softer materials by way of example. The comminution apparatus 100 is configured to crush the materials by pushing them by force against metal but also by using the materials fed into the comminution apparatus 100 to crush itself by launching the material against an autogenous layer of crushed material. The comminution apparatus 100 may be a vertical shaft impact crusher.

The comminution apparatus 100 comprises a roof 102 and a chamber 104. The chamber 104 is arranged on a support of a base 106 of the comminution arrangement 100. The roof 102 is arranged on top of the chamber 104.

The comminution apparatus 100 further comprises a hopper (not shown). The hopper is arranged inside the roof 102. The hopper may comprise a centrally arranged opening in an upper part of the hopper. The hopper may be configured to receive materials to be crushed through the centrally arranged opening. The hopper is further configured to feed the material to the chamber 104.

The comminution arrangement 100 further comprises a rotor 108. The rotor 108 is arranged inside the chamber 104. The rotor 108 is configured to rotate around an axis during operation when the rotor 108 receives the material. The rotor 108 is arranged to launch material to be comminuted towards a surface. The surface may be arranged within the chamber 104 but outside the rotor 108. Thus, the rotor 108 is the main working component of the comminution apparatus 100. The rotor 108 will be further discussed in connection with FIGS. 2 and 5.

Figure 2:
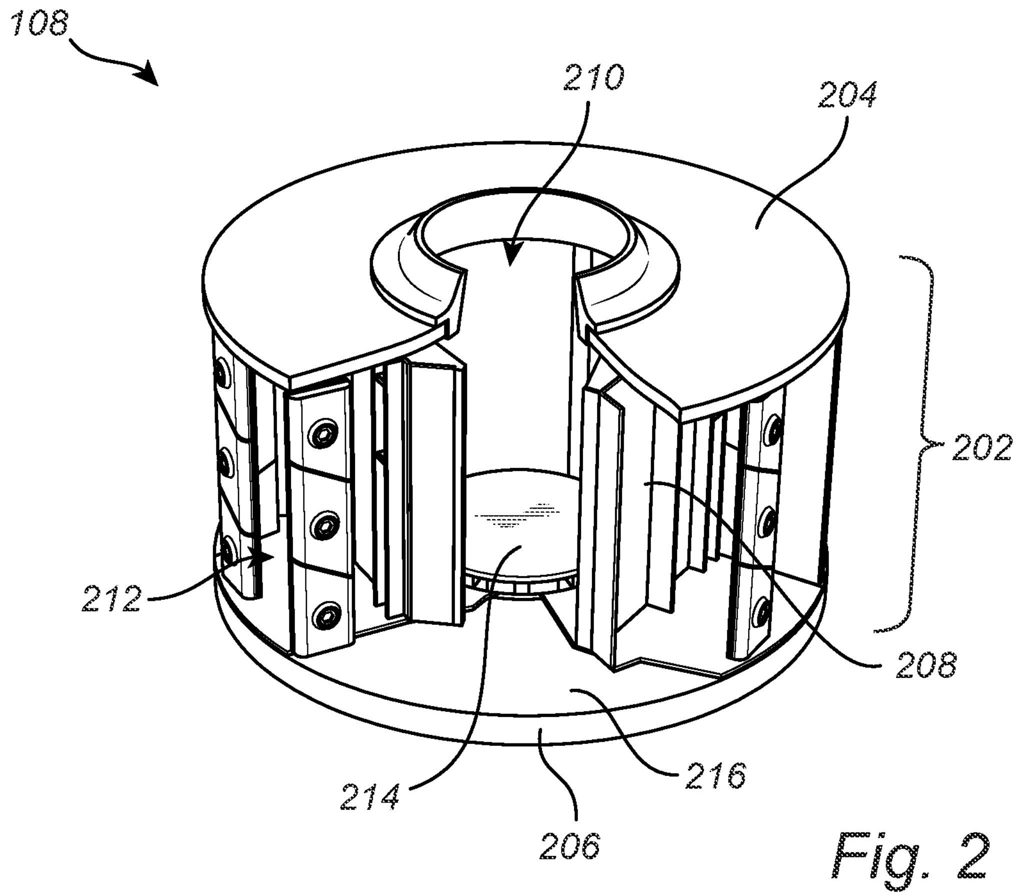
FIG. 2 shows an interior of a rotor comprised in the comminution apparatus of FIG. 1.

FIG. 2 illustrates the rotor 108 introduced in connection with FIG. 1 in further detail. The rotor 108 comprises a frame 202, sometimes also called weldment. The frame 202 includes an upper plate 204, a lower plate 206 and wall elements 208. The wall elements 208 may extend between the upper plate 204 and the lower plate 206.

The rotor 108 comprises an inlet opening 210 arranged in the upper plate 204 and one or more outlets 212 located between the upper plate 204 and the lower plate 206. The material is arranged to be launched through the one or more outlets 212 towards an outer crushing surface, such an autogenous surface of crushed material.

The rotor 108 comprises a distributor plate 214. The distributor plate 214 is arranged at an upper surface 216 of the lower plate 206. The upper surface 216 of the lower plate 206 is arranged below the inlet opening 210. In use, the distributor plate 214 of the rotating rotor is arranged to receive the material received through the inlet opening 210 in a generally vertical direction and to divert the material in a generally horizontal direction and launch it towards the outer crushing surface through the one or more outlets 212. The distributor plate 214 comprises a cavity 218. The cavity 218 is open at a lower surface of the distributor plate 214 and is closed towards an upper surface of the distributor plate 214.

The distributor plate 214 is discussed in further detail in connection with FIG. 4.

Figure 3A:
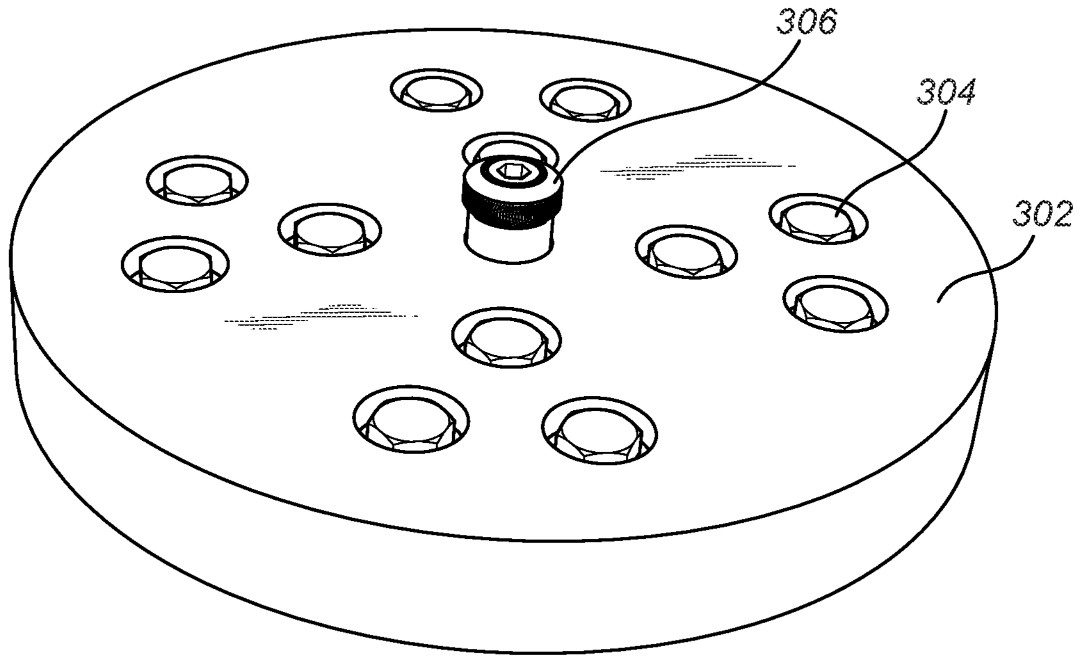
FIG. 3A shows a mounting plate of the rotor of FIG. 2 and attachment means according to an embodiment of the present disclosure.

FIG. 3A illustrates the mounting plate 302. The mounting plate 302 may be attached to the upper surface of a rotor boss arranged below the rotor 108 to which the lower plate 206 of the rotor 108 is also attached. The mounting plate 302 may be attached to the rotor boss by a plurality of bolts 304. The mounting plate 302 comprises a central recess in which attachment means 306 is configured to be installed. The attachment means 306 may be arranged to attach the distributor plate 214 to the rotor 108. The attachment means 306 may be arranged to maintain the distributor plate 108 at the mounting plate 302 and thereby, maintain the distributor plate 214 in the rotor 108. The attachment means 306 may be arranged to enable the distributor plate 108 to be repositioned into different wear positions by rotating it relative to the mounting plate and the lower plate 206 of the rotor 108. The attachment means 306 are arranged to frictionally and possibly also mechanically engage with a corresponding surface of the cavity 218 of the distributor plate 214.

Figure 3B:
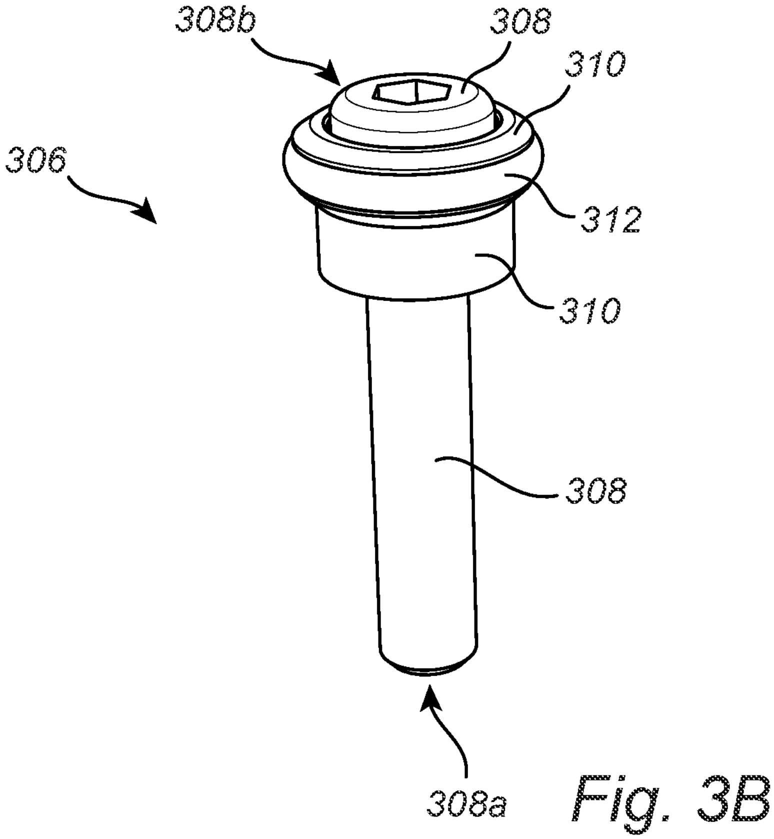
FIG. 3B shows a more detailed view of the attachment means of FIG. 3A.

FIG. 3B illustrates the attachment means 306 in further detail. The attachment means 306 comprises a shaft 308 having a first end 308*a* and a second end 308*b*. The attachment means 306 may be attached to the mounting plate 302 by installing the first end 308*a* of the attachment means 306 into the center recess of the mounting plate 302 by means of e.g. a threaded connection, welding, or other suitable fastening means. The attachment means 306 further comprise a hub 310 arranged at the second end 308*b*. The attachment means 306 further comprise a friction enhancing means 312 arranged at the hub 310. The friction enhancing means 312 may be arranged along the entire circumference of the hub 310 or at parts thereof.

The attachment means 306 is configured to receive the distributor plate 214 such that the attachment means 306 is interacting with a corresponding inside surface in the distributor plate 214. The attachment means 306 are arranged to frictionally and possibly also mechanically engage with a corresponding surface of the cavity 218. Thereby, the distributor plate 214 is kept in place by the attachment means 306.

FIG. 4*a* illustrates the distributor plate 214 according to one embodiment. The distributor plate 214 comprises a top plate 402, a middle plate 404 and a base plate 406.

The base plate 406 comprises a base recess 408. The middle plate 404 comprises a middle recess 410. The base recess 408 and the middle recess 410 are comprised in the cavity 218. The base recess 408 and the middle recess 410 are centered in the middle and base plates. In this embodiment, the cavity 218 is closed towards the upper surface of the distributor plate 214 by means of top plate 402. It is, however, possible to create a blind hole in either the base plate 406 or in middle plate 404, the latter in combination with a through hole in the base plate 406. Thereby, the top plate 402 can have a substantially continuous surface without bolt holes or similar that increase wear.

The middle plate 404 and the top plate 402 are attached to each other by adhesive means or the like. A collar 412 is configured to be installed in the middle recess 410 of the middle plate 404. The collar 412 may be welded to the middle plate 404. The collar 412 may be made of steel. The collar 412 may have a similar outer diameter to the inner diameter of the base recess 408 of the base plate 406 such that it may pass through. The collar 412 extends downwardly outside the middle plate 404. The middle plate 404 and the top plate 402 may be installed on top of the base plate 406, wherein part of the collar 412 extending outside the middle plate 404 may be received by the center recess 408 of the base plate 406.

The base plate, middle plate 404 and top plate 402 may all be provided as circular discs and may all have the same or at least substantially the same diameter The middle plate 404 comprises circumferentially protrusions 414 and recesses 415 arranged to alleviate rotation of the distributor plate 214.

The distributor plate 214 may be installed on the upper surface of a rotor boss extending through by means of mounting plate 302 with the attachment means 306, as discussed above. The base plate 406 may be attached to the upper surface of the mounting plate 302 with the attachment means 306 inside the rotor 108 in a first step. The attachment means 306 may be installed through the center recess 408 of the base plate 406. In a second step, the middle plate 404 and the top plate 402 may be attached to the attachment means 306, on top of the base plate 406. The attachment means 306 may be inserted into the collar 412 attached to the middle plate 404. Thus, the second end 308*b* of the attachment means 306 may be facing a lower surface 416 of the top plate 402. In order to completely attach the distributor plate 214 to the attachment means 306, the distributor plate 214 may be pushed in place.

The attachment means 306 are arranged to frictionally engage with the corresponding surface of the cavity 218. The friction enhancing means 312 of the attachment means 306 may be arranged to frictionally engage with the corresponding surface of the cavity 218. The friction enhancing means 312 may be arranged to frictionally engage with an inside surface of the collar 412. By pushing the distributor plate 214 in place, the friction enhancing means 312 may be arranged such that a friction or a holding force may be applied to the collar 412, and thereby to the distributor plate 214. The force may be applied in a radial direction. The friction enhancing means 312 may be a spring, wherein the force may be a spring force in the radial direction. This arrangement provides for that the distributor plate 214 may be kept in place. This arrangement provides for that the attachment means 306 and the distributor plate 214 are attached to each other in a reliable and stable way. In addition, this arrangement provides for that there is no need for a bolt, or the like, going through the entire distributor plate 214 in order to keep the distributor plate 214 in place.

As can be seen in FIG. 4*b*, the cavity 218 arranged within collar 412 may have a slightly funnel-shaped region 430 at a lower part thereof. This simplifies the procedure of mounting the distributor plate 214 onto the attachment means 306. Preferably, the lowermost part of the collar 412 has an inner diameter which is larger than the outer diameter of the friction enhancing means 312. The inner diameter of the collar 412 is then gradually reduced such that the friction enhancing means 312 is radially compressed with an increased friction between the friction enhancing means 312 and the inner surface of the collar 412 as a consequence.

As can also be seen in FIG. 4*b*, the cavity 218 has a recess 440 in the inner side wall. This recess 440 has a shape which at least partly matches that of the friction enhancing means 312. In this embodiment, the recess 440 has a part torus shaped cross section and extends along a circumference of the inner side wall of the cavity 218. The corresponding shapes of the recess 440 and the friction enhancing means 312 create a mechanical holding force in addition to the friction force created between the outer surface of the friction enhancing means 312 and the inner side wall of the cavity 218. This increases the holding force that prevents the distributor plate 214 from lifting upwardly. This is especially advantageous since such lifting could cause dirt and debris to get under the distributor plate 214 which could cause imbalance and other problems. It is clear that instead of a part torus shaped recess, having a cross section comprising a circular segment with an arc defining the side wall in the cavity, the cross section of the recess could have many other shapes. For example, triangular, part elliptical, etc. As long it creates a recess in which the friction enhancing means, in addition to the friction holding force, can expand partly into creating a mechanical holding force against a lifting of the distributor plate, any shape is conceivable.

FIG. 4*c* shows an alternative embodiment of the distributor plate 214. Here, the entire distributor plate 214 is provided as a one-piece part. Thus, instead of being realized by means of a plurality of plates, the distributor plate 214 is made from a single piece. The cavity 218, possibly having a recess in the sidewall as defined above, may therefore be realized directly in the distributor plate 214. However, it is also possible to provide a collar that is inserted into the distributor plate 214. The upper surface of the distributor plate 214 may be provided with wear resistant elements or the entire distributor plate 214 may be manufactured from a wear resistant material. Similar to previous embodiments, the distributor plate 214 is provided with protrusions 414 and recesses 415 to alleviate rotation of the distributor plate 214.

FIG. 5 illustrates the rotor 108 comprising the distributor plate 214 as discussed in connection with FIG. 4. In addition to what have been discussed above in connection with FIGS. 1-4, it is further illustrated a rod 502. The rod 502 is placed between the base plate 402 and the top plate 406 in the recess between two adjacent protrusions 414 of the middle plate 404. An operator may be able to reposition the distributor plate 214 into different wear positions by using the rod 502. The operator may rotate the distributor plate 214 from an outside of the rotor 108. There is no need to loosen any bolts, or the like, or to lift the distributor plate 214 in order to reposition the distributor plate 214.

Thus, when the distributor plate 214 being repositioned, the friction enhancing means 312 is arranged to keep the distributor plate 214 in place, i.e. avoiding that the distributor plate 214 is lifted. This is possible because of the friction enhancing means 312 which applies forces to the distributor plate 214 as discussed in connection with FIG. 4*a*-4*c*. Thus, the attachment means 306 provides for that the distributor plate 214 is kept down both during operation of the rotor 108 but also and repositioning thereof, while still allowing such rotational repositioning. As discussed earlier, the inner wall of the cavity 218 may be provided with a shape that matches that of the friction enhancing means 312, thereby adding mechanical holding force to the friction holding force.

The person skilled in the art realizes that the present disclosure by no means is limited to the preferred embodiments described above. On the contrary, many modifications and variations are possible within the scope of the appended claims. For example, the distributor plate has been exemplified herein as being made up of one, two or more parts. The skilled person realizes that this could be done in many ways. For example, it could be made from as many discs or similar as deemed necessary within the scope of the present invention. Further, the shape of the upper surface of the distributor plate can be substantially flat but also convex or concave. Also, the mounting plate has been defined as being attached to the rotor boss to which also the lower plate of the rotor is attached. However, it is also possible to attach the mounting plate to the lower plate directly. Also, the mounting plate may be a part of the distributor plate.

Additionally, variations to the disclosed embodiments can be understood and effected by the skilled person in practicing the claimed disclosure, from a study of the drawings, the disclosure, and the appended claims.

The invention claimed is:

1. A rotor for a comminution apparatus, the rotor being arranged to launch material to be comminuted towards a contact surface, the rotor comprising:

a frame including an upper plate, a lower plate and wall elements extending between the upper plate and the lower plate;

an inlet opening in the upper plate and one or more outlets located between the upper plate and the lower plate, wherein the inlet opening is arranged to receive the material and wherein the material is launched through the one or more outlets towards the contact surface; and a distributor plate arranged at an upper surface of the lower plate below said inlet opening wherein the distributor plate is arranged to launch the material towards the contact surface, wherein the distributor plate comprises a cavity being open at a lower surface of the distributor plate, wherein the rotor further comprises attachment means for maintaining the distributor plate at the upper surface of the lower plate, wherein said attachment means are arranged to frictionally engage with a corresponding surface of the cavity and wherein the attachment means enable the distributor plate to be repositioned into different wear positions.

2. The rotor according to claim 1, wherein the cavity is closed towards an upper surface of the distributor plate.

3. The rotor according to claim 1, wherein the attachment means comprises a shaft having a first end and a second end, a hub provided at the second end and a friction enhancing means arranged at the hub.

4. The rotor according to claim 1, wherein the distributor plate comprises a base plate and a top plate, wherein the cavity comprises a base recess in the base plate which is arranged to receive the attachment means.

5. The rotor according to claim 1, wherein the distributor plate further comprises a middle plate and wherein the cavity comprises a middle recess in the middle plate which is arranged to receive the attachment means.

6. The rotor according to claim 5, wherein the middle plate is provided with circumferentially protrusions.

7. The rotor according to claim 3, wherein the friction enhancing means is made of a metal material or a polymer material.

8. The rotor according to claim 1, wherein the top plate is made of wear resistant material.

9. A comminution apparatus comprising a rotor in accordance with claim 1.

10. The comminution apparatus in accordance with claim 9, wherein the comminution apparatus is a vertical shaft impactor.

11. The rotor according to claim 7 wherein the metal material is steel.

12. The rotor according to claim 7 wherein the polymer material is rubber.

13. The rotor according to claim 8 wherein the wear resistant material is tungsten.

* * * * *